Figure 1:
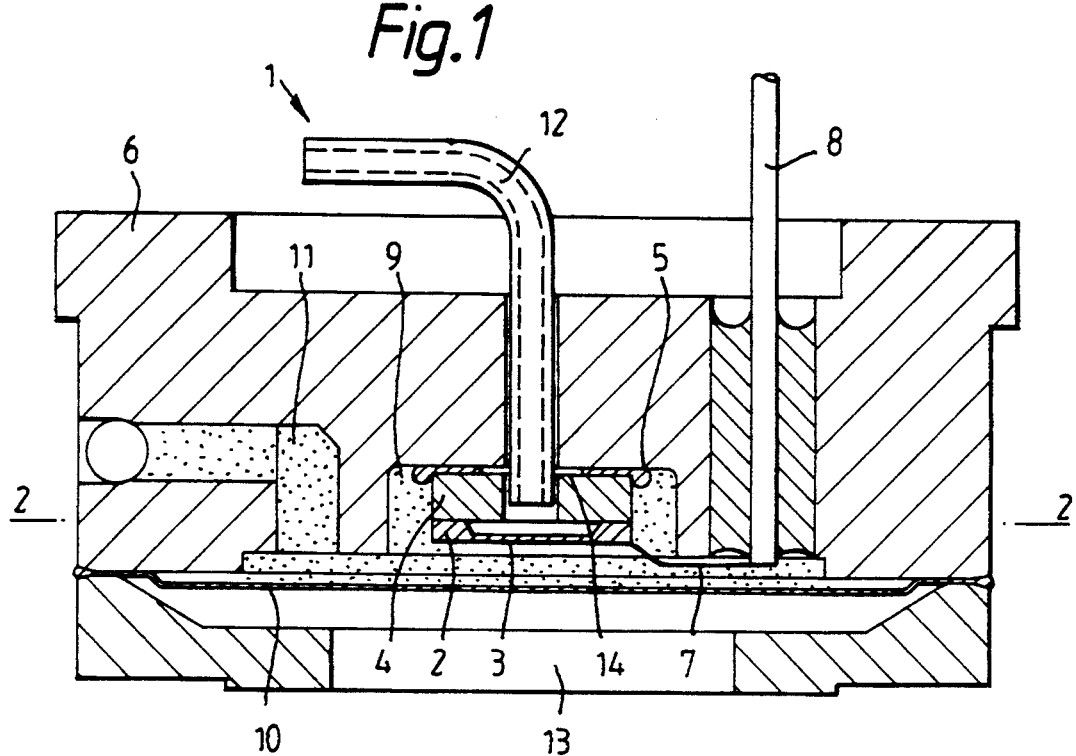

United States Patent [19]

Vogler et al.

[11] Patent Number: 5,333,507
[45] Date of Patent: Aug. 2, 1994

[54] PRESSURE SENSOR AND A METHOD FOR THE MANUFACTURE THEREOF

[75] Inventors: Jes V. Vogler, Sydals; Jürgen W. Adelhelm, Sonderborg, both of Denmark

[73] Assignee: Danfoss A/S, Nordborg, Denmark

[21] Appl. No.: 153,481

[22] Filed: Nov. 16, 1993

Related U.S. Application Data

[63] Continuation of Ser. No. 31,636, Mar. 15, 1993, abandoned.

[30] Foreign Application Priority Data

Apr. 8, 1992 [DE] Fed. Rep. of Germany ........ 4211816

[51] Int. Cl.⁵ .............................................. G01L 7/00
[52] U.S. Cl. ......................................... 73/756; 73/706
[58] Field of Search ................. 73/706, 720, 721, 726, 73/727, 756; 338/3, 4; 156/423, 424

[56] References Cited

U.S. PATENT DOCUMENTS

| | | | |
|---|---|---|---|
| 3,712,143 | 1/1973 | Weaver et al. | 73/720 |
| 4,502,335 | 3/1985 | Wamstad et al. | 73/721 |
| 5,186,055 | 2/1993 | Kovacich et al. | 73/756 |

FOREIGN PATENT DOCUMENTS 0317664  4/1992  European Pat. Off. ............. 73/756

*Primary Examiner*—Richard E. Chilcot, Jr.
*Assistant Examiner*—William L. Oen
*Attorney, Agent, or Firm*—Wayne B. Easton

[57] ABSTRACT

A pressure sensor unit having a pressure chamber formed in a housing by a plate member having a diaphragm region. The plate is fastened to the housing via an adhesive which is disposed in a joint between an inner housing surface and an intermediate support member which limits the movement of the adhesive in a direction transverse to the pressure direction.

6 Claims, 1 Drawing Sheet

PRESSURE SENSOR AND A METHOD FOR THE MANUFACTURE THEREOF

This application is a continuation of U.S. Pat. application Ser. No. 08/031,636, filed Mar. 15, 1993, which is now abandoned.

The invention relates to a pressure sensor with a housing, a plate having a diaphragm region, and an intermediate support on which the plate is mounted and which is joined to the housing by means of an adhesive, and a method for the manufacture of a pressure sensor in which a plate having a diaphragm region and an intermediate support are joined together and the intermediate support is adhesively secured to a housing, in which method an adhesive is applied to the housing and/or to the intermediate support.

A pressure sensor of that kind and a method of that kind are known, for example, from U.S. Pat. No. 4,675,643. The intermediate support in that case consists of a glass substrate, while the plate can be manufactured from a semiconductor material, such as silicon. The function of the intermediate support here is to insulate the plate from the housing. The housing normally consists of a metal, for example, steel.

The problem with such pressure sensors is that the plate and the housing have widely differing thermal expansion coefficients. If the housing expands more than the plate with the diaphragm when there is an increase in temperature, this can lead to distortion of the diaphragm, with the result that the measuring results are falsified. Efforts are currently being made to eliminate a part of the stresses caused by the differing thermal expansion coefficients through the intermediate support or its fixing means. At relatively low pressures it is sufficient in that case to use a resilient adhesive, which is able to accommodate mechanical stresses, that is to say, allows a certain relative displacement between the intermediate support and the housing.

For higher pressures, however, in EP 0 140 992 A1 a further layer, which is intended to have the same thermal expansion coefficient as the plate, is used between the intermediate support and the housing, in order to reduce the stresses generated by a change in temperature.

A similar construction is described in EP 0 317 664 A1. In this publication, a carrier plate and a base plate are adhesively joined by means of a resilient adhesive layer. The base plate, on which the intermediate support and the plate having the diaphragm are mounted, is clamped to the carrier plate by means of a clamping member.

U.S. Pat. No. 4,364,276 describes a differential pressure meter for relatively large system pressures. The silicon plate serving as the actual sensor is mounted on a glass substrate, which is secured to a carrier layer of metal, for example, an iron-nickel alloy, the join between the three layers being effected by means of a bonding technique. With this pressure sensor, the metal part is intended to act as a supporting layer for the glass substrate, so that the sensor is always able to provide an accurate measuring result, even at high system pressures, without being deformed by the high hydrostatic pressures occurring.

U.S. Pat. No. 5,090,247 describes a further semiconductor pressure sensor which can also be used for relatively high pressures. For that purpose the intermediate support carrying the diaphragm is joined to the housing by means of an elastomeric seal. On an increase in the pressure on the diaphragm, the pressure on the elastomeric seal also increases, so that at a relatively high pressure the seal tightness is improved.

The invention is based on the problem of providing a pressure sensor which is of extremely simple construction and can be used at great static and pulsating pressure loads, and of specifying a method for manufacturing such a pressure sensor.

This problem is solved in a pressure sensor of the kind mentioned in the introduction in that the adhesive is arranged in a joint between the housing and the intermediate support, which joint limits movement of the adhesive at least in one direction transverse to the direction of pressure.

This measure prevents the adhesive being squeezed out from between the housing and the support at extreme pressure loads. That would lead to a reduction or even to a loss of the holding force imparted by the adhesive between the housing and the intermediate support. Because movement of the adhesive transverse to the direction of pressure is limited in at least one direction, although escape of the adhesive is basically allowed at elevated pressure, complete removal of the adhesive from the space between the housing and the intermediate support is prevented. At low pressures the adhesive, which must be sufficiently resilient, is, however, capable of absorbing the stresses between the intermediate support and the housing, so that no distortion of the plate occurs and distortion of the diaphragm can therefore be avoided.

In an advantageous construction, provision is made for the intermediate support to have a middle region around which the joint is arranged, the joint having a bounding face which prevents movement of the adhesive into the middle region. In other words, in the middle region of the intermediate support there is formed a stop which limits the movement of intermediate support and housing towards one another prior to complete engagement of the intermediate support and the housing against one another. Around the middle region there is therefore in each case a space, in which the adhesive can remain. The forces caused by the hydrostatic pressures acting on the plate and on the diaphragm can therefore be absorbed without the adhesive being squeezed completely out of the joint. A kind of self-limiting effect occurs as a result.

The bounding face can be formed in a wide variety of ways. Firstly, the bounding face of the joint can be formed by a circumferential face of a projection which projects from the housing towards the intermediate support. The projection can also be formed on the intermediate support and project towards the housing. Finally, to produce the bounding face it is also possible to use an intermediate plate that is arranged between the housing and the intermediate support and the circumferential face of which serves as the bounding face. In all three cases, before the intermediate support and the housing engage completely against one another, which would lead to the adhesive being displaced, a mechanical barrier becomes effective which ensures that the joint maintains a predetermined minimum volume.

Furthermore, it is of great advantage that the bounding face defines a region free from adhesive, through which a counterpressure duct in the housing is guided. With the construction of the pressure sensor as a differential pressure sensor, pressure can therefore be applied to the diaphragm from both sides. It has proved especially advantageous herein that the bounding face prevents the adhesive passing into the counterpressure duct during manufacture and from blocking or constricting this.

Frictional contact faces lying on the housing and the intermediate support preferably have an increased smoothness. This reduces the friction between the intermediate support and the housing so that with different expansions of housing and intermediate support as a result of temperature fluctuations, a relatively free movement of the two parts relative to one another is ensured.

The joint preferably has a size in the region of a few hundredths of a millimetre. A size in this range is large enough to accommodate sufficient adhesive so that on the one hand a reliable fixing of the intermediate support and housing to one another is guaranteed, but on other hand the layer is sufficiently resilient at low pressures to compensate for mechanical stresses between the intermediate support and the housing.

The problem is solved in the method of the kind mentioned in the introduction in that prior to application of the adhesive a means bounding the adhesive area is created. This means bounding the adhesive area can be produced, for example, as stated above, by projections on the housing or on the intermediate support, or an intermediate plate is used, which is mounted on the housing and/or on the intermediate support before the adhesive is applied.

Figure 2:
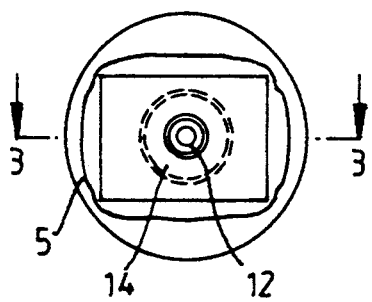
Figure 3:
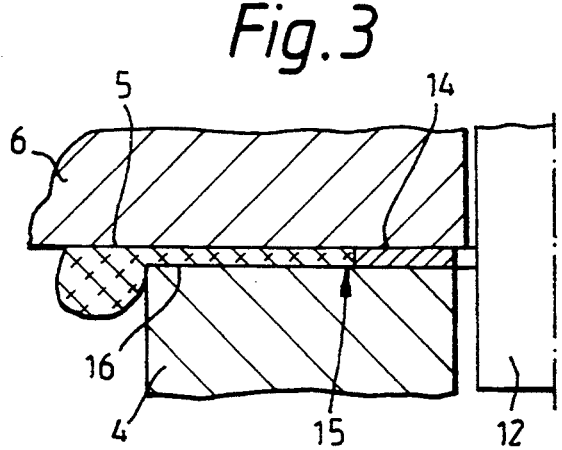
Figure 4:
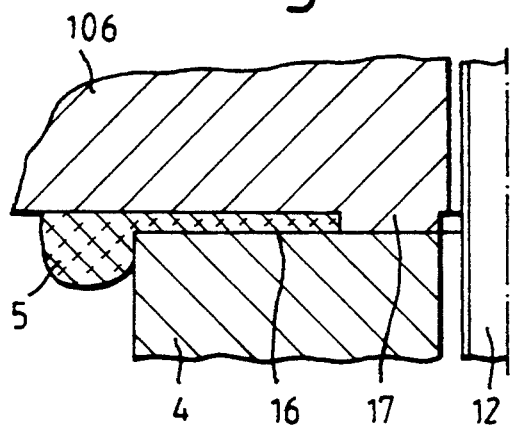
Figure 5:
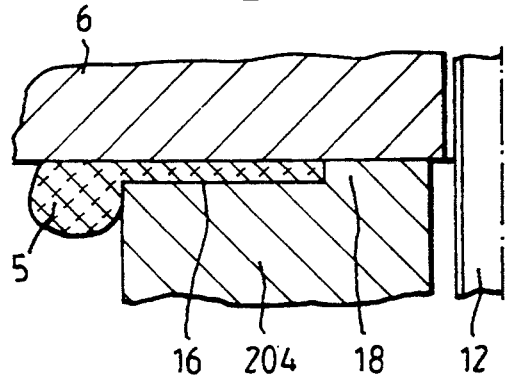

The invention is described below with reference to preferred embodiments in conjunction with the drawings, in which FIG. 1 shows a cross-section through a pressure sensor, FIG. 2 shows a fragmentary section according to FIG. 1 along the line A—A, FIG. 3 shows a section according to FIG. 2 along the line B—B, FIG. 4 shows a modified embodiment based on FIG. 3, and FIG. 5 shows another modified embodiment.

A pressure sensor 1 comprises a plate 2 having a diaphragm 3, which is joined to an intermediate support 4. The intermediate support is in its turn joined by means of a resilient adhesive 5 to a housing 6.

The housing 6 consists of metal. The intermediate support 4 is formed by a glass substrate. The plate 2 with diaphragm 3 consists of silicon. Resistors or other electrical components are incorporated in the diaphragm 3 in manner known per se and not illustrated, for example, by doping. The electrical properties of these components change with mechanical stressing or flexing of the diaphragm 3. The magnitude of the change in the electrical properties of these components is a measure of the pressure to which the diaphragm 3 is being subjected.

Electrical leads 7 lead from the electrical components, not illustrated, through a connection 8 to an evaluator arrangement, not shown in detail.

The intermediate support 4 with the plate 2 is arranged in a pressure chamber 9 provided in the housing 6, the pressure chamber being closed by an auxiliary diaphragm 10 and filled with a pressure medium 11, for example, silicone oil. Pressures acting on the auxiliary diaphragm 10 propagate through the pressure medium 11 to the diaphragm 3 of the plate 2 causing the diaphragm to flex and thus causing a change in the electrical properties of the electrical components that are a measure of the pressure being applied. The auxiliary diaphragm 10 in its turn can be pressurized from the outside through an opening 13 in the housing 6.

To use the pressure sensor 1 as a differential pressure meter, a counterpressure duct 12 which is lead through the housing 6 and the intermediate support 4 is provided. Pressures are able to communicate through the counterpressure duct 12 with the other side of the diaphragm 3. Flexing of the diaphragm 3 is then effected in dependence on the pressure difference between the two pressures on the two sides of the diaphragm 3.

An intermediate plate 14, which has, for example, a thickness of 0.04 mm, an external diameter of 2 mm and a bore of 1 mm diameter and which can be made of steel is arranged between the housing 6 and the intermediate support 4. The intermediate plate 14 has an outer circumference 15 that serves as a bounding face for the adhesive 5. At the same time, the intermediate plate 14 acts as a stop on movement of housing 6 and intermediate support 4 towards one another. Even at very strong pressures, an adhesive joint 16 remains between the housing 6 and the intermediate support 4, from which the adhesive 5 cannot be pressed or squeezed out. The movement of the housing 6 and the intermediate support 4 towards one another is limited by the intermediate plate 14. At the same time, with its outer circumference 15 the intermediate plate 14 prevents adhesive being able to penetrate into the middle region of the intermediate support even at high pressures. Even when adhesive is being forced outwards at high pressures, a sufficient amount of adhesive still remains behind in the joint 16 to maintain the adhesive force between the housing 6 and the intermediate support 4. The adhesive used can be, for example, a silicone adhesive, for example silicone rubber.

FIG. 4 shows a modified embodiment, in which identical parts have been given the same reference numbers as in FIGS. 1 to 3, and corresponding parts have been provided with reference numbers increased by 100. The intermediate plate 14 has here been replaced by a projection 17 formed in the housing 106 and projecting towards the intermediate support 4. The projection 17 forms on the one hand the stop for the movement of the intermediate support 4 and the housing 106 towards one another, and on the other hand it defines the joint 16, so that the adhesive may be squeezed out of the joint 16 to the outside but is unable to penetrate into a middle region of the intermediate support 4. When the adhesive 5 is applied to the housing 106, the projection 17 at the same time prevents the adhesive from getting into the counterpressure duct 12.

In FIG. 5, in which identical parts have been provided with the same reference numbers as in FIG. 1 and corresponding parts have been given reference numbers increased by 200, the intermediate plate 14 has been replaced by a projection 18, which is formed on the intermediate support 204 and projects towards the housing 6. This projection 18 in principle has the same function as the projection 17 in FIG. 3 or the intermediate plate 14 in FIGS. 1 to 3.

We claim:

1. A pressure sensor, comprising,
a metal housing defining a chamber, said housing having a flat abutment surface forming a wall for said chamber,
a plate member of a semiconductor material having a central diaphragm region, a plate support member of a glass substrate material between said housing abutment surface and said plate member, spacing means separating said support member from said housing abutment surface in a direction normal thereto, said support member having a flat surface in spaced (parallel) relation to said housing flat abutment surface to form a transversely extending space therebetween, said plate support member having a second surface in abutting engagement with said plate member, and an adhesive disposed in said transversely extending space having the moving thereof limited in a direction transverse to the plane of said housing abutment surface and to said plate member diaphragm region.

2. A pressure sensor according to claim 10, characterized in that said plate support member has a central bore and said spacing means has the form of an annularly shaped projection on said support member which prevents movement of said adhesive into said central bore.

3. A pressure sensor according to claim 1, characterized in that said housing has a central bore and said spacing means has the form of an annularly shaped projection on said housing which prevents movement of said adhesive into said housing central bore.

4. A pressure sensor according to claim 1 characterized in that said housing has a central bore and said spacing means has the form of a ring shaped plate which prevents movement of said adhesive into said housing central bore.

5. A pressure sensor according to claim 1 characterized in that said housing, said support member and said spacing means jointly form a central bore, and a duct disposed in said bore having an end thereof adjacent said plate member diaphragm region.

6. A pressure sensor according to claim 1 characterized in that said joint chamber has a depth on the order of a few hundredths of a millimeter.

* * * * *